Aug. 7, 1934.  G. H. BARBER ET AL  1,969,196
VEST POCKET FLASH LIGHT
Filed Dec. 20, 1929   3 Sheets-Sheet 1
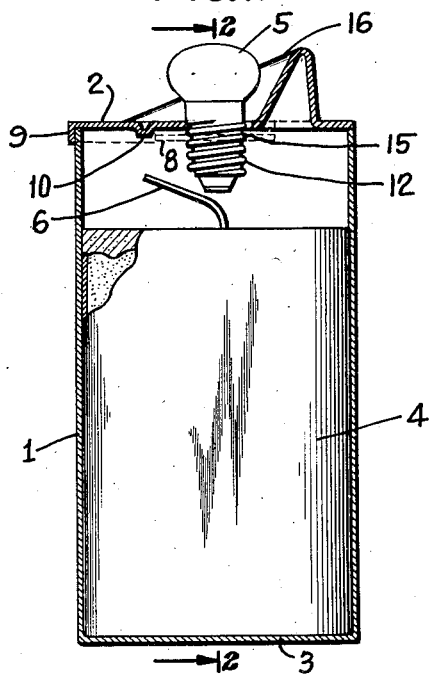
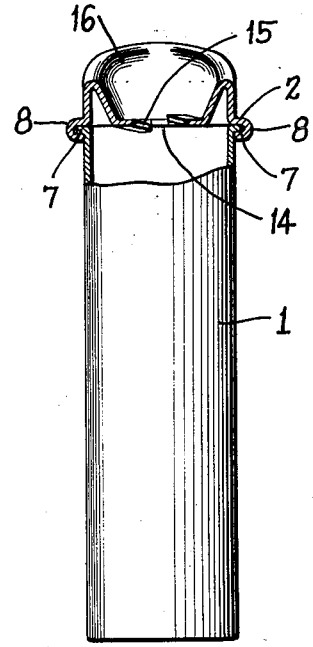
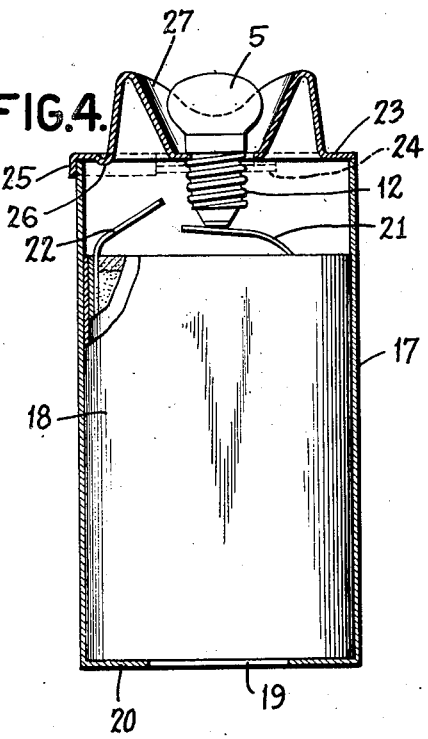
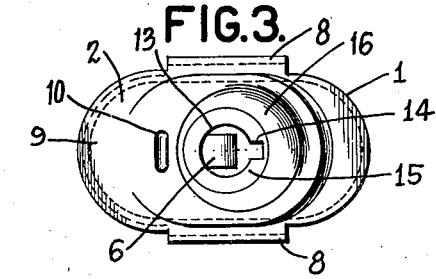
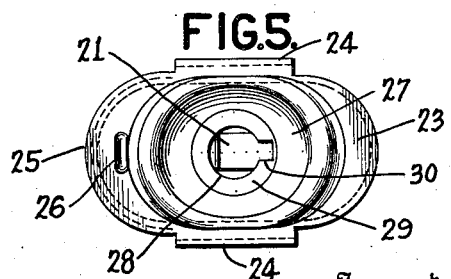
Inventors
GOODRICH B. PRATT
GEORGE H. BARBER
By their Attorneys
Bohleber & Ledbetter Aug. 7, 1934.    G. H. BARBER ET AL    1,969,196
VEST POCKET FLASH LIGHT
Filed Dec. 20, 1929    3 Sheets-Sheet 3
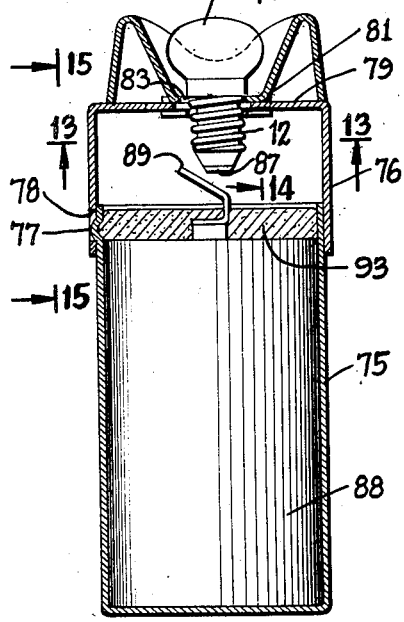
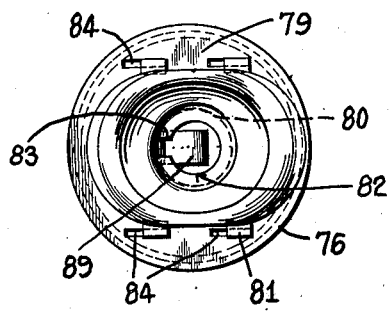
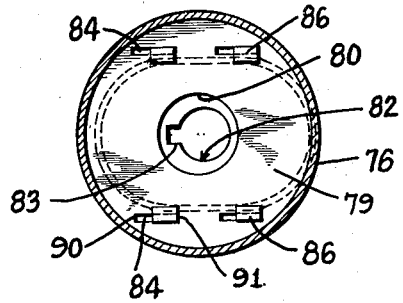
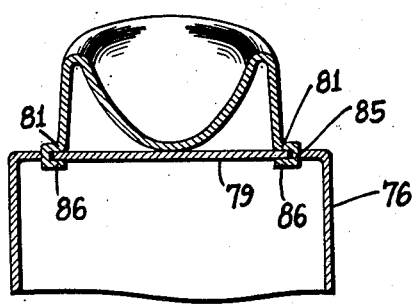
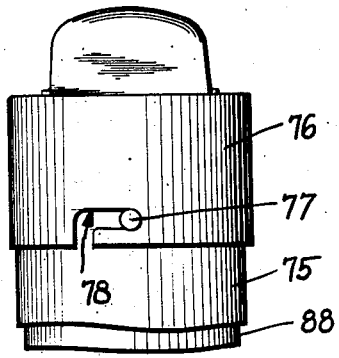
Inventors
Goodrich B. Pratt
George H. Barber
By their Attorneys
Bohleber + Ledbetter Patented Aug. 7, 1934

1,969,196

UNITED STATES PATENT OFFICE 1,969,196

VEST POCKET FLASH LIGHT

George H. Barber, New Rochelle, N. Y., and Goodrich B. Pratt, Jersey City, N. J., assignors to Bond Electric Corporation, Jersey City, N. J., a corporation of Delaware Application December 20, 1929, Serial No. 415,513

3 Claims. (Cl. 240—10.65)

This invention relates to flashlights, and more particularly to improvements in portable vest-pocket type of flashlights in which an electric miniature lamp is carried in association with a small electric battery with provision of means for completing the electric circuit from the battery to the lamp for lighting the lamp when desired.

The objects of the invention are to provide an improved circuit closing means for flashlights; to obtain a closure of the circuit by relative movement of parts of the battery enclosure; to provide a structure wherein the circuit will not be inadvertently closed while carrying the flashlight in a pocket, bag or the like; to close the circuit with a simple movement of parts easily effected by fingers of the same hand that holds the flashlight; to close the circuit by a short lateral movement of the enclosure cap on the container; to reduce the number of parts for a flashlight to a minimum; to enable the parts to be stamped, drawn or otherwise produced from sheet material; to mount the lamp in the cap without addition of an extra part to constitute the socket for said lamp; to provide for ready replacement of the battery; to secure simplicity of construction and operation, and to obtain other advantages and results as may be brought out in the following description.

Referring to the accompanying drawings in which like numerals of reference indicate similar parts throughout the several views;

Figure 1 is a longitudinal sectional view of a flashlight embodying the invention;

Figure 2 is an edge elevation of the same shown partially in section on line 2—2 of Figure 1;

Figure 3 is a plan of the cap end of the improved flashlight;

Figure 4 is a longitudinal sectional view similar to Figure 1 showing a modified construction;

Figure 5 is a plan of the cap of this modified construction;

Figure 11 shows a modification of the invention applied to a cylindrical flashlight battery cell;

Figure 12 is a top plan view of the structure shown on Figure 11;

Figure 13 is a horizontal sectional view taken in the plane indicated by the line 13—13, Figure 11, the lamp being removed;

Figure 14 is a vertical sectional view taken in the plane indicated by the line 14—14 of Figure 11; and Figure 15 is a view, in side elevation, looking from the left in Figure 11.

Figure 6:
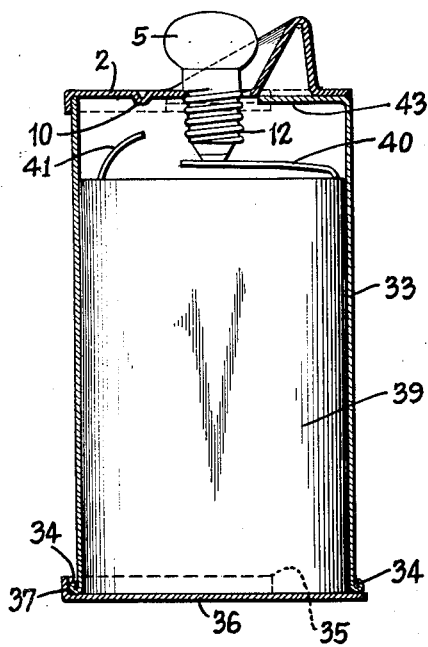
Figure 6 is a view substantially similar to Figure 1, but showing a structure modified thereover in that the battery is removable.

In the specific embodiment of the invention illustrated in said drawings, there is shown an enclosure in Figures 1, 2 and 3 comprising a container 1 and top or cap 2. Preferably the container is of a somewhat flattened shape so as to be readily carried in one's pocket, and as a result, the cap as shown is longer in one direction than in the other direction. For convenience in reference, therefore, we will refer to the longer edges of the cap as the sides thereof and the shorter edges as the ends of the cap. The corresponding portions of the container will likewise be referred to as the sides thereof and as the ends thereof. Said cap 2 constitutes what may be considered the top of the container, the bottom comprising a wall 3 preferably a permanent part of the container and forming therewith an enclosure for a battery 4 of one or more cells, said battery being built into the container, as a result of which, when a new battery is required, the cap 2 is merely released from the old container and applied to a new one which has another battery 4 therein. In this construction, the container is of metal and forms a conductor from one pole of the battery to a lamp 5 in the top or cap. The other pole of the battery is of leaf spring construction, designated by numeral 6, and projects from the upper end of the battery at a middle part thereof.

Cap 2 for the enclosure is positioned at the upper edges of the side and end walls of the container 1 and is properly shaped so as to overlie those edges in closed position and follow the contour of the container in so doing. The cap is, however, preferably mounted on the container so as to be movable with respect thereto, the mounting in the present showing being such that the cap may be slid in a direction longitudinally of itself and transversely with respect to the container. For obtaining this movable or slidable mounting of the cover or cap 2 we have shown the two side walls of the container provided with outwardly turned parallel flanges 7, 7 at the edges of said side walls next the cap. The cap is provided with corresponding wings 8, 8 at its side edges, said wings flaring outwardly to overlie said flanges and then curling downwardly and inwardly to underlie said flanges. The arrangement, proportion and engagement of parts is such that the wings are slidable with respect to the flanges so the cap may be slid back and forth, but is such that there is a frictional engagement between the parts sufficient to prevent inadvertent sliding of the cap, requiring instead, that the cap be positively actuated by other means than merely gravity, momentum or light touches.

Sliding movement of the cap is limited in both directions by suitable stops. In the present showing, we have provided a turned down lip 9 on one end of the cap which will engage the outside of the end wall of the container and limit movement of the cap in a closing direction. A spaced distance from said lip 9, we have shown the face of the cap depressed, as at 10, thereby forming a projection which will engage the inside margin of the same end wall of the container and limit movement of the cap in its open position.

In order to mount the lamp 5 by its usual screw-threaded shell 12 in the cap, we have shown the cap provided with a central hole 13, the margin around said hole being cut radially, as at 14, and the margin 15 stamped in the shape of one convolution of a helix corresponding to the pitch of the threaded shell or base of the lamp. The ends of the helix will be thus separated the width of one screw-thread and will be at the radial cut 14, thus enabling the threads on the shell of the lamp to be fed onto the helical margin of hole 13 and the lamp screwed home so as to be firmly held. This construction enables us to stamp or otherwise produce the cap from a single piece of sheet metal.

A reflector is preferably provided in connection with the lamp, said reflector in the present showing constituting an integral part of the cap. In the figures now being described we have chosen to illustrate a reflector of the angular type, that is, one which directs the rays of light at an angle to the axis of either the lamp or the flashlight. The reflector, designated by numeral 16 is formed by drawing the metal forming the cap outward a progressively increasing distance from two opposite sides of the lamp socket 13—15 with the drawn out portions inclined inwardly and having the greatest height at a third side of the lamp. On the opposite side of the lamp opening from this greatest height of the reflector, the metal of the cap is drawn substantially not at all. The light from the lamp is accordingly reflected angularly with respect to the axis of the flashlight. We prefer that the light deflection shall be toward the side to which the cap is slidable when open. Drawing the metal for the reflector from the metal of the cap enables us to maintain a one-piece construction for the cap.

It is to be observed that the construction of cap and mounting of the lamp therein is such that the lamp depends from the cap within the container, and that the container walls are somewhat higher than the top of the battery in order to accommodate the depending portion or base of the lamp. The parts are so proportioned and arranged that the lower end of the lamp base 12 is adjacent to but out of contact from the leaf-spring battery terminal 6 projecting from the top of the battery, in normal position of parts, that is, when the cap 2 is in position closing container 1. It is also to be noted that the said leaf-spring terminal 6 is bent or deflected away from the vertical toward or over which the cap slides when moved to open position. The deflection of the terminal is such that its free end portion is in the path of transverse movement of the lower end of the lamp, as a result of which said lower end or central terminal of the lamp engages and slides along the surface of said terminal making electrical contact therewith when the cap is slid to its open position, thereby completing the electric circuit to the lamp, which becomes illuminated. Particular attention is called to the fact that the container may be held in the hand of the user and the cap slid by a finger, such as the thumb of the same hand which is holding the container, that finger conveniently resting against the back side of the reflector and moving the cap in the direction toward which light is desired. The parts thus coordinate to render manipulation, simple, natural and effective.

When the battery becomes worn out, a new one may be incorporated by substituting a new container with built-in battery for the old one. This substitution is rendered possible by virtue of the walls of the container extending beyond the upper end of the battery. Consequently, by pressing inwardly on the opposite side walls in proximity to flanges 7, 7, said flanges may be withdrawn from engagement in the curled wings 8, 8 thereby enabling the cap to be removed from the container. By similarly squeezing the free upper portions of the side walls of the new container, the cap may be placed with its curled wings opposite the flanges 7, 7 thereon, at which time the side walls may be released and the flanges will spring into place within said curled wings by virtue of the natural resiliency of the side walls.

It is not to be understood by the foregoing description that we confine ourselves to the details of construction shown and described, as many variations may be made within the scope of our invention. For instance, we may provide a container 17 from which a battery 18 is removable for replacement purposes, as shown in Figures 4 and 5. In such construction it is desirable, to have the battery fit snugly in the container, and we provide, if desired, a finger hole 19 in the bottom wall 20 of such container through which the finger may be inserted to push out a used battery. The container in this case is not used as an electrical conductor, the battery 18 being shown with two leaf-spring terminals 21, 22 one of which, as 21, underlies the lamp and is, preferably, in constant contact therewith, while the other one, 22, is upstanding so as to be engaged by the threaded shell 12 of lamp 5 when the cap is slid to open position, but becoming disengaged by said shell when the cap is slid to closed position, over the container.

Cap 23 in the construction of Figures 4 and 5, is transversely slidable as in the previously described construction. Said cap has curled over wings 24 engaging outwardly directed flanges on the upper edges of the side walls of the container, and also has stops 25 and 26 for limiting the amplitude of movement of the cap similar to stops 9 and 10 described in connection with the preceding figures. We have, however, shown a difference in this cap over the formerly described cap, in that we show a reflector 27 thereon which projects from the general plane of the cap at an equal angle entirely around the light.

Such a reflector will direct the rays in the same general direction as the axis of the flashlight, and serves to illustrate that various shapes of reflectors may be utilized in practice. The reflector in this case is also preferably an integral part of the cap, thus maintaining the desirable one-piece construction thereof. The central part of the cap within the reflector has a central hole 28 with the margin 29 cut radially as at 30 and the margin stamped to provide a helical convolution for receiving the lamp base 12 as will now be understood from the foregoing description. Operation of this type of cap is effected just as in the previously described construction, namely, by pushing against the outside of the reflector. Likewise removal of the cap is effected as before described by pressing in at the sides of the container next the flanges. Of course, the caps may be used interchangeably with either container 1 or 17.

Figure 7:
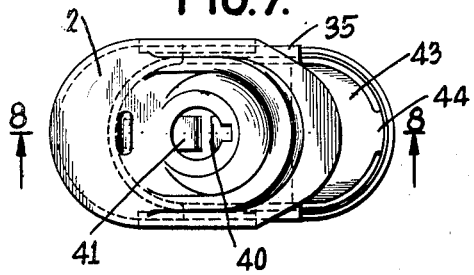
Figure 7 is a view showing the flashlight of Figure 6 looking from above, but showing the cap in circuit closing position.
Figure 8:
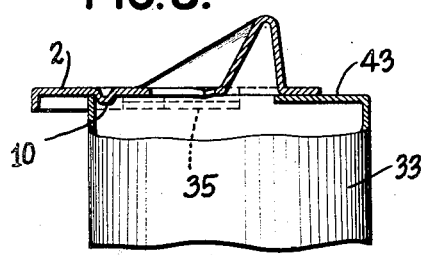
Figure 8 is a fragmentary view of the structure shown at the top of Figure 6 with the sliding top moved to circuit closing position.

In Figures 6, 7 and 8 there is shown a construction substantially similar to that hereinbefore described. In this instance, however, the container 33 is open at its lower end. The bottom edge of container 33 is conveniently rolled, as at 34, both to provide a finished appearance and, along the sides, to serve as flanges receiving a bottom. These flanges 34 are engaged by turned over lips 35 on the bottom 36 which bottom is adapted to be slid off from the container 33, by movement toward the left as viewed in Figure 6, movement off the container in the opposite direction being prevented by the upturned edge or stop 37 formed on the bottom 36 which stop engages the rolled edge 34 of the container 33.

The top 2 is shown as identical with that illustrated in Figure 1 and needs no further description at this point.

The battery 39 is formed as a separate, replaceable unit which may be inserted through the open lower end of the container 33 when the bottom 36 is removed. This battery 39 is shown as having a pair of leaf spring terminals 40 and 41 respectively. The central terminal of the base 12 of the lamp is always in contact with the longer leaf contact 40 and when the cap 2 is given a movement of translation until the stop 10 contacts with the end wall of the container 33, the threaded shell terminal of the lamp base 12 is brought into electrical connection with the other spring terminal 41 and the lamp illuminated, substantially the same as described in connection with Figure 4.

Figures 6, 7 and 8 also illustrate an inwardly turned lip 43, which may be integral with the upper edge of one end of the container 33 so as to lie beneath the cap 2 and when the cap is moved to circuit closing position, as shown in Figures 1 and 8, substantially close what would otherwise be an opening in the top of the container. Thus a more sightly appearance is presented by the flashlight. This top is conveniently struck out of the same blank as the container 33 and is substantially semi-circular as shown in Figure 7 being joined to the end portion of the container by a narrow portion 44.

Figure 9:
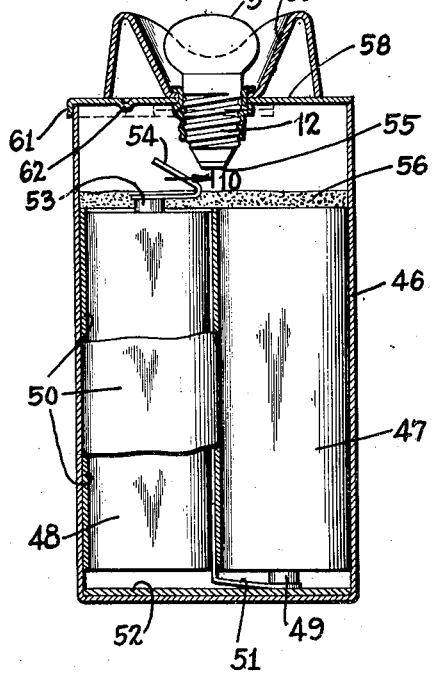
Figure 9 shows a modification of the flashlights of Figures 1 to 8, in which the sliding top is a composite structure.
Figure 10:
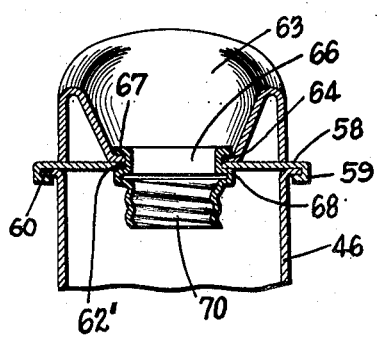
Figure 10 is a vertical sectional view on the line 10—10 of Figure 9, looking in the direction of the arrows.

In Figures 9 and 10 a container 46 is illustrated having the general shape of the container 1 shown in Figure 1. The battery, which is permanently disposed in the container 46, conveniently consists of two cylindrical cells 47 and 48, cell 47 being upside down with respect to cell 48 with its carbon pole 49 at the bottom, while cell 48 is so positioned that its carbon pole is at the top. Cell 48 is insulated from cell 47 by being wrapped with non-conductive material, such as paper 50. The carbon pole 49 of cell 47 is electrically connected to the zinc cup of cell 48 by a conducting strip 51, and the battery 47, 48 thus formed rests upon an insulating layer 52 on the integral bottom of the container 46. There is secured to the carbon pole 53 of cell 48 an angularly bent spring contact strip 54 so disposed that its effective portion lies generally near the central part of the container 46 and is adapted to be engaged by the central terminal 55 of the lamp base 12 when it is moved to the left, (as viewed in Figure 9) when the cap is given a movement of translation as previously described. The electrical circuit whereby the lamp is illuminated may be traced from pole 49 of cell 47 to the zinc cup of cell 48 by conductor 51, thence from the carbon pole 53 through the contact 54 to one pole of the lamp. From the threaded shell of the lamp base 12 the circuit includes the top or cap 58, next to be described, to the metallic container 46 and back to the zinc cup of cell 47 with which it is in contact. The top of the battery is sealed as with a layer of pitch 56.

The cap shown in Figures 9 and 10 is a composite structure, and comprises a substantially flat plate or base 58 formed along the sides with downwardly and inwardly turned flanges 59 which engage lips 60 formed on the top side edges of the container 46. This plate is also formed with a downwardly extending flange or stop 61 at one end and intermediate its ends and nearer the stop 61 with another stop 62 preferably formed by depressing a portion of the plate 58. These two stops, as will be understood, limit the movement of translation of the cap in making and breaking the electrical circuit through the lamp as in the previously described embodiments. Intermediate the ends, preferably midway, the plate 58 is formed with a hole 62' through which the base 12 of the lamp passes. The reflector 63 is separate from the plate 58 and is conveniently pressed or otherwise formed from a single sheet. The reflector is illustrated as projecting from the general plane of the plate 58 at an equal angle entirely around a central hole 64 of the same size as the hole 62' in plate 58.

In assembling this cap 58, 63 the plate 58 and reflector 63 are so positioned with respect to each other that the holes 62' and 64 are in register. The two parts 58 and 63 are then secured together by what is in effect an eyelet 66 having a top flange 67 adapted to overlie the edge of the hole 64 and a bottom flange 68 extending beneath the edge of hole 62', so as to clamp the two parts together. The hole in eyelet 66 is of a diameter sufficient to permit the base 12 of the lamp to pass therethrough and preferably the bottom flange 68 has a lamp socket 70 depending therefrom to receive and hold the threaded base 12 of the lamp, in such position that it projects downwardly within container 46 for engagement with the battery terminal. This construction enables the reflector to be formed without excessive strain on the metal and permits assembly in a simple fashion.

In some situations it may be found desirable to utilize a transversely movable lamp support with cylindrical dry cells which may be of material size as the source of electric current for the lamp. A flashlight employing this feature is illustrated in Figures 11 to 15.

A cylindrical cup 75 which may be the zinc cup of a battery 88 has telescoped over its upper end an inverted metallic cup 76. This cup 76 is conveniently held in position by one or more lugs 77 on the casing 75 which are received in bayonet slots 78 in the cap 76. The top 79 of cup 76 is formed with an oversize hole 80, through which the lamp base 12 extends downwardly into contact making position and moves diametrically in closing and opening the electrical circuit. The lamp 5 is carried in a cap or top or slide 81 which is preferably formed or pressed into the shape of a reflector such as is illustrated in Figures 11-15 as diverging upwardly from the lamp at a constant angle all around. Obviously, however, a reflector of the shape shown in Figure 1 may be availed of. The reflector or cap 81 is conveniently formed with a hole 82 centrally thereof in register with hole 80 in cup 76 and the margin of hole 82 is cut out radially, as at 83, and stamped to provide a helical convolution for receiving the threaded end of the lamp 5 as previously described. To enable the slide, while a part of the cup 75, to have a transverse movement with respect to the cup, the top 79 of the cup is slotted, as at 84, on opposite sides of the hole 80 to receive the tongues 85 carried with the slide 81, which tongues 85 are passed through the slots 84 and bent inwardly beneath the top 79, as at 86, to prevent separation of the reflector, slide and top. It will thus be seen that the ends 90 of slots 84 serve as stops to limit the movement of the cap 81 into circuit making position while the opposite ends 91 of the slots 84 limit movement of the cap 81 into "off" position.

The battery 88 within the casing 75 has an angularly bent leaf spring like contact member 89 electrically connected to and preferably mounted on the central terminal of the battery and sealed therein by the wax or pitch seal 93. Thus, although the carbon pole of the battery is in substantial alignment with the hole 80 the contact member 89 is off to one side of the hole and when the slide 81 is moved to one side, say the right as viewed in Figure 11, (the movement of the lamp base 12 being permitted by reason of the fact that the hole 80 is oversize,) the base 12 of the lamp 5 is offset with respect to the center and is out of contact with contact strip 89. When, however, the slide 81 is moved to the other side, say the left hand side as viewed in Figure 11, the central terminal 87 of the lamp 5 contacts with the contact and closes the circuit, illuminating the lamp. The remainder of the circuit, of course, includes the threaded base 12, the slide 81 and cup 76 which is directly in contact with the zinc cap 75 or other terminal of the battery. When light is no longer required, the slide is moved to the right carrying terminal 87 out of engagement with contact 89 thus interrupting the circuit.

Obviously the several caps and reflectors are interchangeable and other detail changes and modifications may be made in the construction and use of our improved flashlight, and we do not wish to be understood as limiting ourselves to only the forms and details shown and described herein, except as set forth in the following claims when construed in the light of the prior art.

What is claimed is:—

1. In a flashlight, in combination, a substantially cup-shaped battery container portion having an open end, a closure portion of substantially the same size and shape as the open end of the container portion, flanges carried with the respective sides of one of said portions and extending in a plane transverse to the axis of the flashlight, curled over wings carried with the respective sides of the other of said portions and removably engaging said flanges for relative movement with respect thereto, a lamp base receiving portion carried with said closure portion and stop means carried with the closure portion to limit, by engagement with the container portion, relative movement of the closure portion with respect to the container portion, the material of said container portion being flexible to that degree necessary to permit relative displacement of the walls thereof toward one another to disengage at least one flange from a curled over wing to thereby permit separation of the closure and container portions.

2. In a flashlight, in combination, a substantially cup-shaped battery container having an open end, a closure of substantially the same size and shape as the open end of the container, flanges carried with the respective sides of said container and extending in a plane transverse to the axis of the flashlight, curled over wings carried with the respective sides of the closure and removably engaging said flanges for relative movement with respect thereto, a lamp socket carried with said closure and stop means carried with the closure to limit, by engagement with the container, relative movement of the closure with respect to the container, the material of said container being flexible to that degree necessary to permit relative displacement of the walls thereof toward one another to disengage at least one flange from a curled over wing to thereby permit separation of the closure and container.

3. In a flashlight, in combination, a substantially cup-shaped battery container having an open end, a closure of substantially the same size and shape as the open end of the container, flanges carried with the respective sides of said container and extending in a plane transverse to the axis of the flashlight, curled over wings carried with the respective sides of the closure and removably engaging said flanges for relative movement with respect thereto, a lamp socket carried with said closure, a reflector drawn outwardly with a double wall upon opposite sides of the lamp socket a progressively increasing distance and being drawn out at least upon one other side between said first named sides to the greatest height, one drawn out portion being inclined inwardly toward the socket and stop means carried with the closure to limit, by engagement with the container, relative movement of the closure with respect to the container, the material of said container being flexible to that degree necessary to permit relative displacement of the walls thereof toward one another to disengage at least one flange from a curled over wing to thereby permit separation of the closure and container.

GEORGE H. BARBER.
GOODRICH B. PRATT.